(12) United States Patent
Takahashi et al.

(10) Patent No.: US 9,002,115 B2
(45) Date of Patent: Apr. 7, 2015

(54) DICTIONARY DATA REGISTRATION APPARATUS FOR IMAGE RECOGNITION, METHOD THEREFOR, AND PROGRAM

(75) Inventors: Kiyotaka Takahashi, Tokyo (JP); Kotaro Yano, Tokyo (JP); Takashi Suzuki, Kawasaki (JP); Hiroshi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 258 days.

(21) Appl. No.: 13/527,235

(22) Filed: Jun. 19, 2012

(65) Prior Publication Data

US 2012/0328198 A1 Dec. 27, 2012

(30) Foreign Application Priority Data

Jun. 22, 2011 (JP) .................. 2011-138693

(51) Int. Cl.
*G06K 9/46* (2006.01)
*G06K 9/00* (2006.01)
*G06K 9/62* (2006.01)

(52) U.S. Cl.
CPC .......... *G06K 9/00281* (2013.01); *G06K 9/6228* (2013.01)

(58) Field of Classification Search
None
See application file for complete search history.

(56) References Cited

U.S. PATENT DOCUMENTS

| | | | |
|---|---|---|---|
| 7,187,786 B2* | 3/2007 | Kee | 382/118 |
| 7,532,745 B2* | 5/2009 | Inoue | 382/118 |
| 8,254,645 B2* | 8/2012 | Okubo | 382/118 |
| 8,583,647 B2* | 11/2013 | Kawanishi et al. | 707/737 |
| 2010/0067751 A1* | 3/2010 | Aoki | 382/118 |
| 2012/0294531 A1* | 11/2012 | Matsubara et al. | 382/190 |

FOREIGN PATENT DOCUMENTS

| | | |
|---|---|---|
| JP | 2007-249588 A | 9/2007 |
| JP | 2009-116385 A | 5/2009 |
| JP | 2009-187186 A | 8/2009 |
| JP | 2009-258991 A | 11/2009 |
| JP | 2011-096136 A | 5/2011 |

* cited by examiner

*Primary Examiner* — Daniel Mariam
(74) *Attorney, Agent, or Firm* — Canon USA, Inc., IP Division (57) ABSTRACT

A dictionary data registration apparatus includes a dictionary configured to be registered a local feature amount for each region of an image with respect to each of a plurality of categories, an extraction unit configured to extract the local feature amount from a plurality of regions of an input image, a selection unit configured to select a plurality of the local feature amounts for each region according to a distribution of the local feature amounts extracted by the extraction unit from a plurality of regions of a plurality of pieces of input images which belongs to the category with respect to each of the plurality of categories, and a registration unit configured to register the selected plurality of local feature amounts on the dictionary as a local feature amount for each region with respect to the category.

9 Claims, 5 Drawing Sheets

DICTIONARY DATA REGISTRATION APPARATUS FOR IMAGE RECOGNITION, METHOD THEREFOR, AND PROGRAM

BACKGROUND OF THE INVENTION

1. Field of the Invention

The present invention relates to a dictionary data registration apparatus for an image recognition, a method therefor, and a program.

2. Description of the Related Art

Conventionally, a face recognition technique has been known in which personal identification is performed by extracting a face region from an image including a human face, and comparing the extracted facial image with a facial image of a particular person which is registered in advance. The face recognition technique is used for a purpose of security, for example, when a person on a camera is authenticated as a registered person, the person is allowed to enter into an office. On the other hand, there is a request to utilize this technique for searching photographs on which the same person is captured. In the former purpose, recognition can be performed with high accuracy by setting a limitation on conditions such as an orientation and a size of a face and illumination when capturing an image of a person. However, in the latter case, there is an issue that image-capturing conditions of the person cover a broad range and recognition accuracy may be reduced. For example, among photographs in which orientations and expressions of the face, and illuminations during image-capturing are different, even the same person in the photographs was sometimes erroneously determined as another person.

To solve such an issue, a method for previously registering a plurality of facial images corresponding to various conditions and performing recognitions is discussed. For example, Japanese Patent Application Laid-Open No. 2007-249588 discusses a method for improving recognition accuracy by previously registering faces in various states such as looking-up faces, bearded faces, open-mouth faces and so forth from input moving images. Japanese Patent Application Laid-Open No. 2009-25899 discusses a method in which the recognition accuracy is improved by previously registering a plurality of facial images with different face orientations.

However, when an attempt is made to register images with different combinations of the conditions such as orientations and expressions of faces, and illuminations, the number of facial images to be registered will become extremely plenty. Further, when many images are registered, it is necessary to perform matching with many registered images when recognition processing is performed, and accordingly, throughput will become large.

SUMMARY OF THE INVENTION

The present invention relates to a dictionary data registration apparatus, in a case where recognition targets and image-capturing conditions vary, capable of performing recognition with high accuracy, if registered data amount is relatively small.

According to an aspect of the present invention, a dictionary data registration apparatus includes a dictionary configured to be registered a local feature amount for each region of an image with respect to each of a plurality of categories, an extraction unit configured to extract the local feature amount from a plurality of regions of an input image, a selection unit configured to select a plurality of the local feature amounts for each region according to a distribution of the local feature amounts extracted by the extraction unit from a plurality of regions of a plurality of pieces of input images which belongs to the category with respect to each of the plurality of categories, and a registration unit configured to register the selected plurality of local feature amounts on the dictionary as a local feature amount for each region with respect to the category.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the present exemplary embodiment, a case will be described in which a plurality of pieces of facial images of a person is input from a moving image as images which are guaranteed to belong to the same category, and dictionary data is created.

Figure 1:
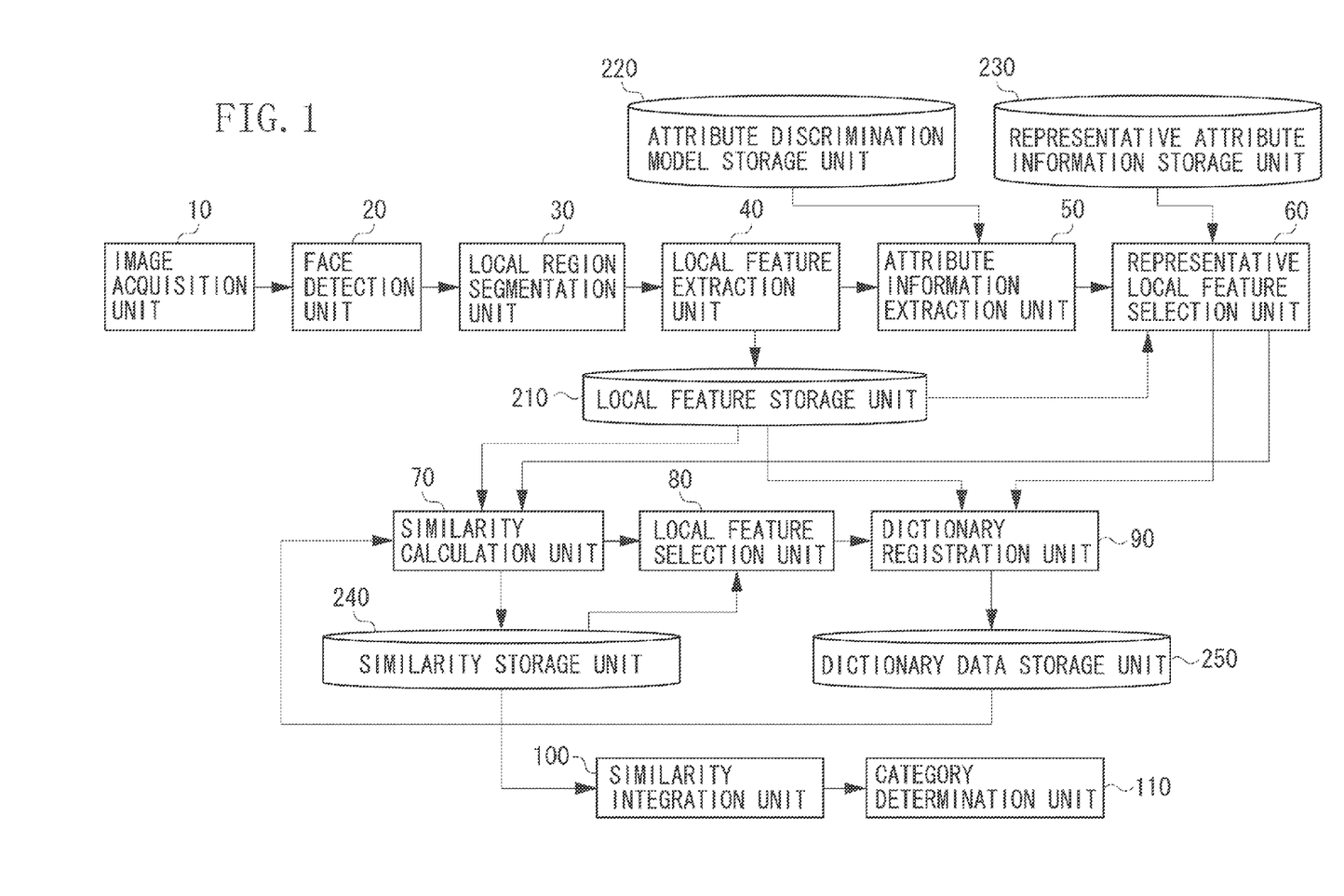
FIG. 1 illustrates an example of a hardware configuration of an image recognition apparatus.

FIG. 1 illustrates an example of a hardware configuration of an image recognition apparatus. An image acquisition unit 10 acquires image data captured by an imaging unit such as a camera. A face detection unit 20 detects a face region in an image from the image data acquired by the image acquisition unit 10. A local region segmentation unit 30 segments the face region detected by the face detection unit 20 into local region images. A local feature extraction unit 40 obtains feature amounts for recognizing a face from the local region images segmented by the local region segmentation unit 30, and stores the feature amounts in a local feature storage unit 210.

An attribute information extraction unit 50 obtains attribute information of the local feature amounts obtained by the local feature extraction unit 40 based on an attribute discrimination model stored in an attribute discrimination model storage unit 220. A representative local feature selection unit 60 selects a local feature amount which has representative variation from the local feature amounts stored in the local feature storage unit 210 based on representative attribute information stored in a representative attribute information storage unit 230 and the attribute information obtained by the attribute information extraction unit 50.

A similarity calculation unit 70 calculates each of similarities in all combinations of the local feature amounts, which are acquired by the local feature extraction unit 40 and stored in the local feature storage unit 210, and stores the similarities in a similarity storage unit 240 as a distribution of the similarities of the local feature amounts. Further, the similarity calculation unit 70 calculates similarities between the local feature amounts stored in the local feature storage unit 210 and the local feature amounts registered in a dictionary data storage unit 250.

A local feature selection unit 80 selects as a registration target a local feature amount which satisfies predetermined registration conditions from among the local feature amounts stored in the local feature storage unit 210 based on the similarities stored in the similarity storage unit 240. A dictionary registration unit 90 registers the local feature amount selected by the representative local feature selection unit 60 and the local feature selection unit 80, in the dictionary data storage unit 250. A similarity integration unit 100 obtains a similarity between an input image and the dictionary data based on the similarities stored in the similarity storage unit 240. A category determination unit 110 determines a category of the input image based on the similarity obtained by the similarity integration unit 100.

Figure 2:
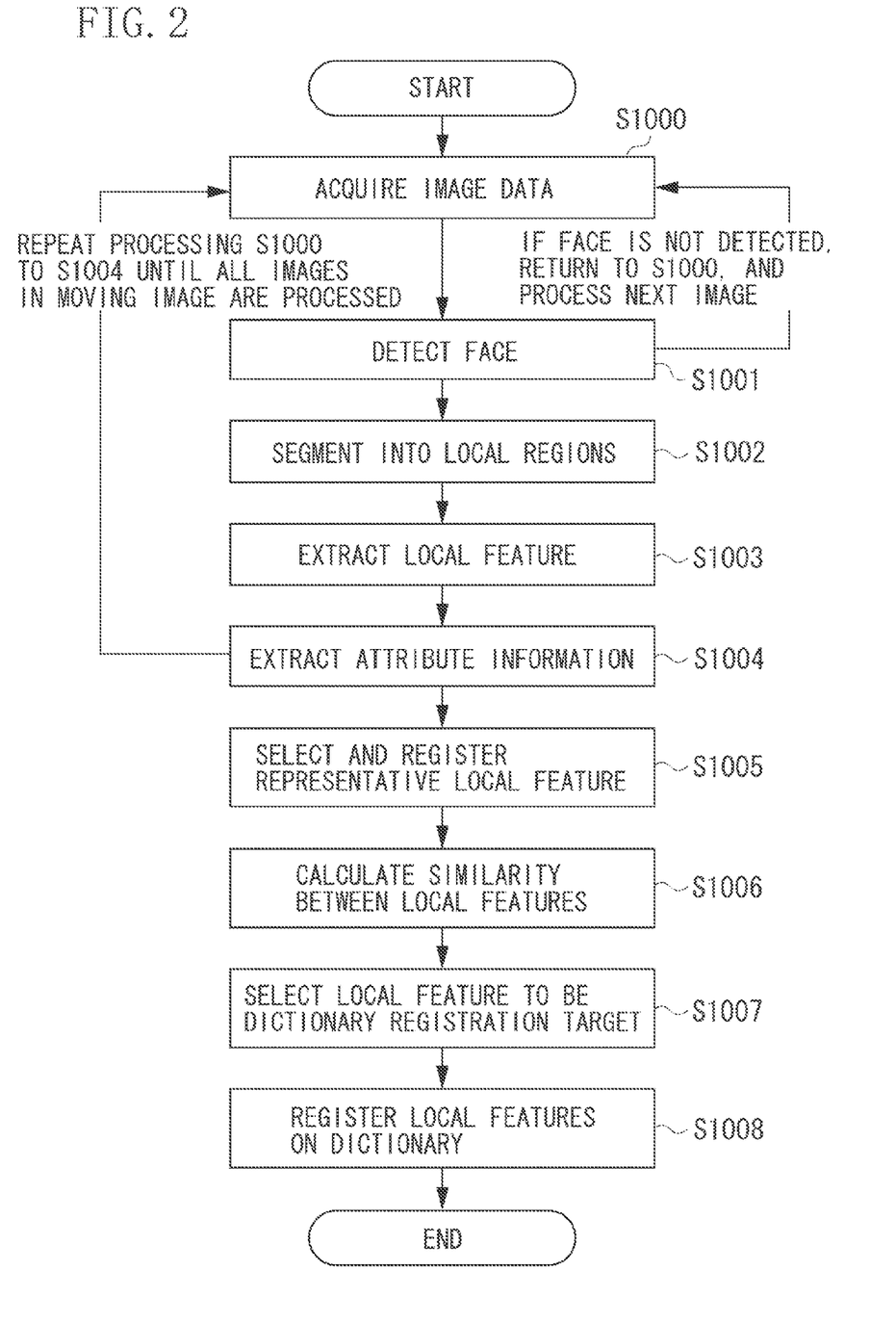
FIG. 2 is a flowchart illustrating an example of registration processing for creating dictionary data.

First, registration processing for inputting a plurality of pieces of facial images of a person from a moving image and creating dictionary data will be described with reference to FIG. 2. FIG. 2 is a flowchart illustrating an example of the registration processing for creating the dictionary data.

In step S1000, the image acquisition unit 10 acquires image data captured by the imaging unit such as the camera.

In step S1001, the face detection unit 20 detects a face from the image data acquired by the image acquisition unit 10. As a method for detecting a human face from an image, a publicly known technique can be used. If a face is detected, the face detection unit 20 acquires a face region image. At this time, a size of a face region varies depending on a distance or an angle of the camera during imaging. Therefore, the face detection unit 20 performs magnification processing on the image data so that the size of the face region matches a predetermined or preset input image size which is assumed in the following process. The magnification processing is assumed in the processing at subsequent stages in the present exemplary embodiment. If a face is not detected, the face detection unit 20 returns the processing to step S1000. Then, the image acquisition unit 10 acquires a subsequent image. If a face is detected, the face detection unit 20 displays the facial image by superimposing a frame indicating the detected face thereon on a display (not illustrated), and enables a user to designate a face to be a registration target on the display via a user interface (not illustrated).

Figure 3:
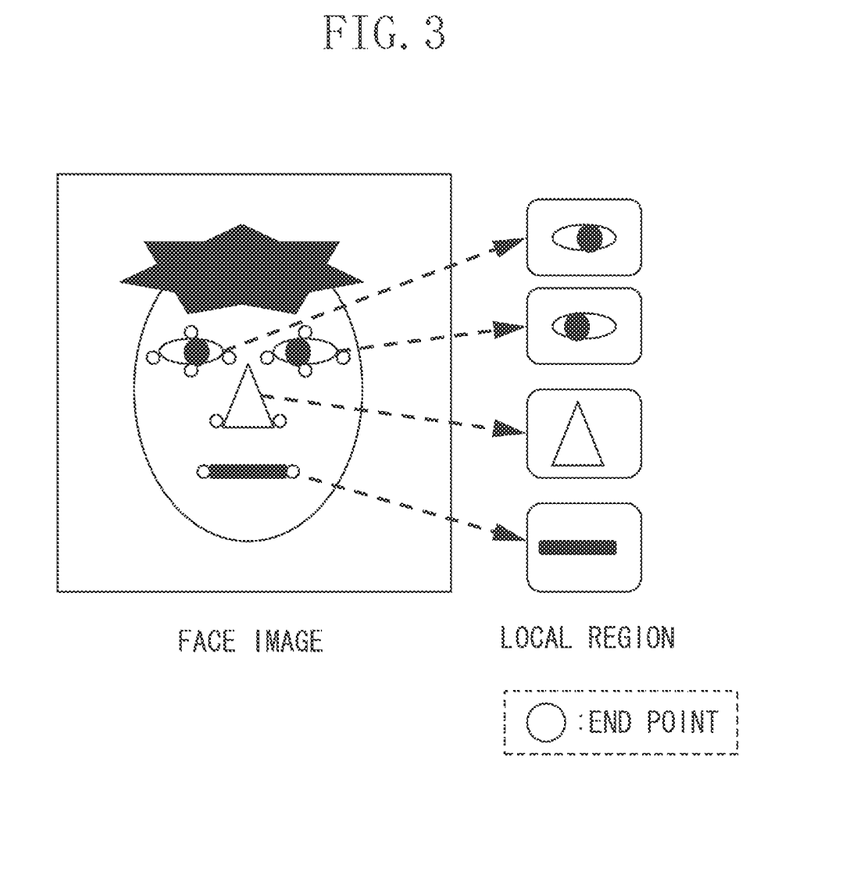
FIG. 3 illustrates an example in which a face region is segmented into local regions.

In step S1002, the local region segmentation unit 30 segments the facial image data acquired by the face detection unit 20 into local region images. More specifically, the local region segmentation unit 30 detects a plurality of feature points from a human facial image, and segments the face region into predetermined rectangular images based on relative positional relationship with the feature points. FIG. 3 illustrates an example in which the face region is segmented into the local regions. As illustrated in FIG. 3, the local region segmentation unit 30 detects end points of constituent elements, such as eyes, a mouth, and a nose as the feature points. These endpoints are selected in advance from regions which are considered to represent features of an individual person such as ends of left and right eyes, corners of the mouth and the nose. The local region segmentation unit 30 segments the face region into image regions each, for example, 5×5 pixels as a local region image based on geometrical positional relationship with these end points. The local region segmentation unit 30 may segment the face region into a whole facial image as one of the local regions.

In step S1003, the local feature extraction unit 40 obtains feature amounts for recognizing a face from the local region images segmented by the local region segmentation unit 30, and stores the feature amounts in the local feature storage unit 210. For example, the local feature extraction unit 40 extracts a luminance values from the local region image and creates a 25-dimensional feature vector from the extracted luminance value, which is taken as a local feature amount. In addition, the local feature extraction unit 40 may extract a color histogram which represents a feature of color, a gradient histogram in an edge direction which represents an edge, and an incremental code as the local feature amount. The local feature extraction unit 40 combines the local feature amounts to make one feature vector.

In step S1004, the attribute information extraction unit 50 obtains attribute information of the local feature amount obtained by the local feature extraction unit 40 based on an attribute discrimination model stored in the attribute discrimination model storage unit 220. The attribute discrimination model is an identification model for multiple class discrimination which learns the local region images such as eyes, a mouth, a nose, etc. in a wide variety of facial images as teacher data and is used for class discrimination of the input local region images. For example, the image recognition apparatus, in a case where lips are taken as a local region, stores the attribute discrimination model of degrees of opening of the lips in the attribute discrimination model storage unit 220 by learning images ranging from an image with closed lips to an image with lips opened to the fullest as the teacher data. The image recognition apparatus performs learning of the attribute discrimination model using, for example, a support vector regression method or the like. The attribute information of the feature amount is output with a numerical value such as "opening degree of lips 0.8", and is temporarily stored in an internal memory in the attribute information extraction unit 50. Processing of the attribute discrimination is performed for each local region. In the recognition of the facial image, it is effective to use an attribute relating to either an orientation of the face or an expression of the face, or both.

A series of processing from the image data acquisition in step S1000 to the attribute information extraction processing in step S1004 are performed on respective images in the moving image. However, the images to be processed need not to be all images in the moving image. For example, the image recognition apparatus, for the purpose of reduction of throughput, may remove several frames such as every two frames, every three frames from the processing target, instead of processing all frames of the moving image. Further, the image recognition apparatus may determine frames as the processing target according to a degree of variations of the facial images in the moving image. For example, if a difference from the frames which were processed in the past is more than a certain level, the image recognition apparatus may take the frame as the processing target.

In step S1005, the representative local feature selection unit 60 selects the representative local feature amount from the local feature amounts stored in the local feature storage unit 210 based on the representative attribute information stored in advance in the representative attribute information storage unit 230 and the attribute information obtained by the attribute information extraction unit 50. First, the representative local feature selection unit 60 calculates a difference between attribute information extracted from each of a plurality of images in the respective local regions and the representative attribute information of the corresponding local region stored in the representative attribute information storage unit 230. Then, the representative local feature selection unit 60 selects a local feature amount corresponding to attribute information in which the calculated difference is the smallest, from the local feature storage unit 210. In this case, the local feature amounts stored in the local feature storage unit 210 and the attribute information acquired by the attribute information extraction unit 50 are all associated with each other for each local region. The representative local feature selection unit 60 performs the above-described processing on all local regions.

The representative attribute information stored in the representative attribute information storage unit 230 is the one extracted by the attribute information extraction unit 50 performing the processing in step S1004 from the local region images which are considered as representative for each local region such as eyes, a mouth, and a nose. For example, in a region of the mouth, attribute information in the region of the mouth is extracted from various facial images input as representative facial images. Then, the attribute information extraction unit 50 stores an average output value of the attribute information in the representative attribute information storage unit 230 as representative attribute information. The representative facial image is, for example, a facial image with a frontal face orientation and with lips closed. In addition, for example, a state in which eyes are naturally opened is preferably taken as the representative attribute information.

In step S1006, the similarity calculation unit 70 calculates each of the similarities in all combinations of the local feature amounts which are acquired by the local feature extraction unit 40 and stored in the local feature storage unit 210. Then, the similarity calculation unit 70 stores the similarities in the similarity storage unit 240 as a similarity distribution of the local feature amounts. The similarity calculation unit 70 uses Euclidean distance as a criterion of the similarity among the local feature amounts. In addition, the similarity calculation unit 70 can use Mahalanobis distance or the like. The similarity calculation unit 70 performs similarity calculation processing on all local regions.

In step S1007, the local feature selection unit 80 selects, as a registration target, a local feature amount, which satisfies the predetermined registration condition, from the local feature amounts stored in the local feature storage unit 210 based on the similarities calculated by the similarity calculation unit 70 and stored in the similarity storage unit 240.

More specifically, the local feature selection unit 80 determines, with respect to all the local feature amounts in one local region, whether a distance from the representative local feature amount falls within a predetermined range as the registration condition by referring to the similarity storage unit 240, and extracts a local feature amount which falls within the predetermined range. In this case, the representative local feature amount is the one selected by the processing in step S1005 for each local region. The range of distance between the local feature amounts defined herein is a value defined based on a threshold value as the criteria in the recognition processing for whether the target image is the image of the same person, which is described below. Then, the local feature selection unit 80 selects local feature amounts with a low similarity to each other from among the local feature amounts extracted through the above-described processing, as the registration targets for a predetermined number of the local feature amounts. In this case, the local feature selection unit 80 obtains combinations of the local feature amounts with the low similarity to each other from the similarities between the local feature amounts and a standard deviation of the similarities in a case where the local feature amounts are arbitrarily selected for the number of registered local feature amounts.

For example, it is defined that the number of the local feature amounts to be selected as "f", a distance indicating the similarity between the local feature amounts calculated by the similarity calculation unit 70 as "di", a standard deviation thereof as "σ", and a value obtained by normalizing a sum of distances with σ as an evaluation function "E". Then, a set of the local feature amounts which yields a maximum evaluation function E is taken as a registration target.

$$E = \frac{\sum_{i=1}^{n} d_i}{\sigma}$$ (Equation 1)

In Equation 1, $n = {}_fC_2$, where C is a symbol of combination.

For example, when the number of the local feature amounts to be registered is "three", the local feature selection unit 80 extracts all combinations of three local feature amounts including the representative local feature amount stored in the local feature storage unit 210, calculates evaluation functions with respect to the respective combinations, and determines the combination in which the evaluation function is the maximum as the registration target.

Without defining the number of the registered local feature amounts in advance, the local feature selection unit 80 may select local feature amounts according to the dispersion of the similarities between the respective local feature amounts. Further, the local feature selection unit 80 may dynamically change a range of the similarity which can be registered according to the dispersion of the local feature amounts acquired by the local feature extraction unit 40.

The local feature selection unit 80 performs the above-described processing on all local regions. The number of the local feature amounts to be registered needs not to be the same at all local regions.

In a case where the local feature amounts which satisfy the registration conditions cannot be selected, the local feature selection unit 80 may change the representative local feature amount, or may prompt the user to re-input the moving image.

In step S1008, the dictionary registration unit 90 registers the local feature amounts selected by the representative local feature selection unit 60 and the local feature selection unit 80 in the dictionary data storage unit 250. The dictionary registration unit 90 assigns a category name to the dictionary data, wherein the category name is assigned during recognition. The dictionary registration unit 90 assigns "name unique to an individual face" as a category name. For example, the dictionary registration unit 90 assigns a personal name or the like as the category name. The dictionary registration unit 90 performs registrations and assignments on all local regions.

The dictionary registration unit 90 may automatically assign an ID number unique to the individual person as the category name. In addition, the user may be allowed to register arbitrary keyword as the personal name. For example, the image recognition apparatus may display a question window whether to register the facial image of the registration target together with the unique ID number or the arbitrary keyword on the display (not illustrated). Then, when the arbitrary keyword is registered, the image recognition apparatus displays a character input column, and registers characters as the personal name which the user inputs therein via the user interface (not illustrated).

In the present exemplary embodiment, a case where the dictionary data of the person as the registration target is not registered is described above. However, if the dictionary data of the person as the registration target is already registered, the image recognition apparatus may perform additional registration or replacement of the dictionary data using the local feature amounts which can be acquired by the processing for creating the dictionary data according to the present exemplary embodiment.

For example, in step S1006, the similarity calculation unit 70 calculates the similarity by adding local feature amounts obtained from newly input image. Then, in step S1007, the local feature selection unit 80 selects the local feature amount through the processing similar to the one described above.

In the above-described example, the image recognition apparatus extracts a plurality of input images from the moving image. However, other method may be used as long as the method can acquire an input image in association with facial images of the same person. For example, the image recognition apparatus associates a plurality of images of the person as the registration target with each other from a database of person photographs, and extracts local feature amounts by repeating the processing from steps S1000 to S1004 with the associated image group.

Figure 4:
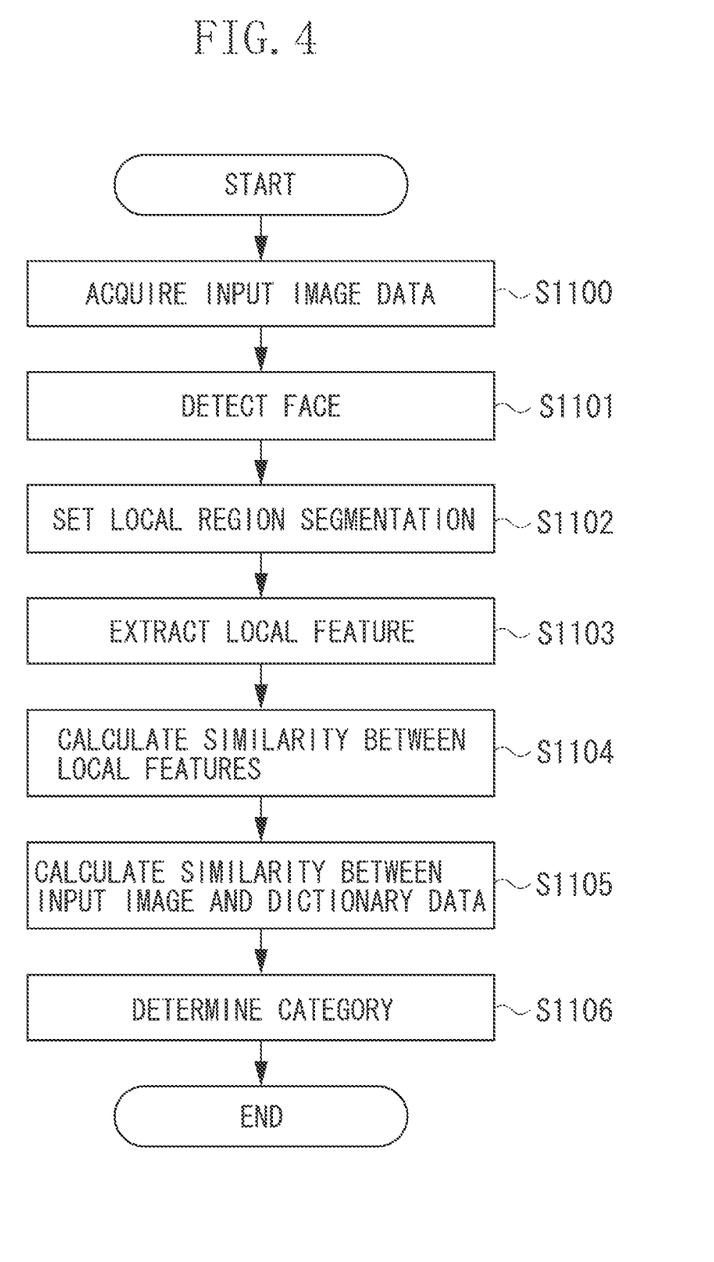
FIG. 4 is a flowchart illustrating an example of recognition processing.

Next, the face recognition processing to be performed based on the dictionary data which is created beforehand by inputting a facial image of the person and performing the above-described registration processing will be described with reference to FIG. 4. FIG. 4 is a flowchart illustrating an example of the recognition processing. In this example, an operation will be described by assuming one piece of input facial image. The processing in steps S1100, S1101, S1102, and S1103 in FIG. 4 are performed similarly to those in steps S1000, S1001, S1002, and S1003 in FIG. 2, respectively, and thus the descriptions thereof will not be repeated.

In step S1104, the similarity calculation unit 70 calculates similarities between the local feature amounts stored in the local feature storage unit 210 and the local feature amounts of the dictionary data for each individual person stored in the dictionary data storage unit 250 by performing the processing similar to the one during the registration, and stores the calculated similarities in the similarity storage unit 240. For example, when a local region for recognizing a face is a NR region, and the number of the local feature amounts for each individual person registered in the dictionary data storage unit 250 for each local region is f, the similarity calculation unit 70 calculates NR×f pieces of similarities. These similarities are classified into each local region and stored in the similarity storage unit 240.

In step S1105, the similarity integration unit 100 obtains the similarity between the input image and the dictionary data from the similarities calculated by the similarity calculation unit 70 and stored in the similarity storage unit 240. First, the similarity integration unit 100 selects a value with the highest similarity as a similarity representing the local region among the similarities calculated by the similarity calculation unit 70 for each local region. Then, the similarity integration unit 100 obtains a sum of the maximum similarity of each local region in all local regions, and outputs the sum as the similarity between the input image and the dictionary data for each individual person. In order to handle a case where the facial images include occlusion or a remarkable change in facial expression, the similarity integration unit 100 may obtain a sum of similarities of the local regions whose similarities is higher than a predetermined value, instead of the sum of similarities of all local regions.

The processing in steps S1104 and S1105 described herein are repeated for the number of the dictionary data pieces for each individual person stored in the dictionary data storage unit 250.

In step S1106, the category determination unit 110 determines a category of the input image based on the similarity obtained by the similarity integration unit 100. More specifically, the category determination unit 110 compares the similarity between the obtained input image and the dictionary data with respect to the dictionary data pieces which belong to the respective categories, and determines the category to which the dictionary data whose similarity between the input image is the maximum belongs as the category to which the input image belongs. However, the category determination unit 110 outputs a result indicating that there is no category to which the input images belongs in a case where the maximum value of the similarity does not exceed a predetermined threshold value. Through the above-described processing, the category to which the input image belongs is identified. In other words, which individual person's face of the face in the input image can be identified.

In this regard, a magnitude of the threshold value with respect to the maximum value of the similarity between the input image and the dictionary data can be set arbitrarily. However, if too large threshold value is set, there is a possibility that an input image originally belonging to either category will be output as "not belong to any category". On the other hand, if too small threshold value is set, there is a possibility that an input image originally not belonging to any category will be output as "belongs to either category". The threshold value may be determined in advance after several adjustments, or may be changeable.

Suppose that the image recognition apparatus would extract the dictionary data by performing clustering on all local feature amounts without selecting the representative local feature amount, there is a possibility that the image recognition apparatus may extract the dictionary data from which the representative local feature amount and the neighborhood thereof cannot be recognized. Further, in a case where a limitation is not set on the registration range, there is a similar possibility that the image recognition apparatus may extracts the dictionary data from which the representative local feature amount and the neighborhood thereof cannot be recognized.

Therefore, in the present exemplary embodiment, the representative local feature selection unit 60 selects the representative local feature amount, and the local feature selection unit 80 sets a limitation for the registration range based on the threshold value in the recognition processing, so that the representative local feature amount and the neighborhood thereof can be surely recognized. Further, since a standard deviation of a distance between the local feature amounts is introduced as an evaluation function, a deviation of the local feature amounts to be registered in the dictionary data can be reduced, and a recognizable range can be extended to a wider range.

In the conventional technique, when a plurality of facial images is registered, the facial images need to be registered on a single-image basis for expressing various variations of faces. On the other hand, according to the present exemplary embodiment, a plurality of facial images can be registered on a local-region basis, so that the registered feature amounts for expressing the above-described images can be reduced.

For example, when image information for five images is registered as the dictionary data, the conventional technique needs to register all five images. On the other hand, according to the present exemplary embodiment, it is necessary to register local feature amounts which are enough to express five pieces of the registered feature amounts for each local region. In other words, since it is not always necessary to register five local feature amounts for all of the local regions, the present exemplary embodiment can reduce the registered feature amounts and perform efficient registration processing.

Further, in the recognition processing, the present exemplary embodiment can deliver high discrimination performance if the number of the dictionary data pieces to be registered is small, and the enhancement of processing efficiency in the recognition processing can be expected.

For example, when five local feature amounts are previously registered for each of all local regions as the dictionary data pieces, similarity calculation processing is performed with respect to five local feature amounts to be extracted from an arbitrary input image. However, according to the present exemplary embodiment, in a case where three local feature amounts each are registered for half of the all local regions, and two local feature amounts each are registered at the remaining half thereof as information amount from which similar discrimination performance can be obtained, a discriminator with the same degree of performance can be generated by a half throughput.

Figure 5:
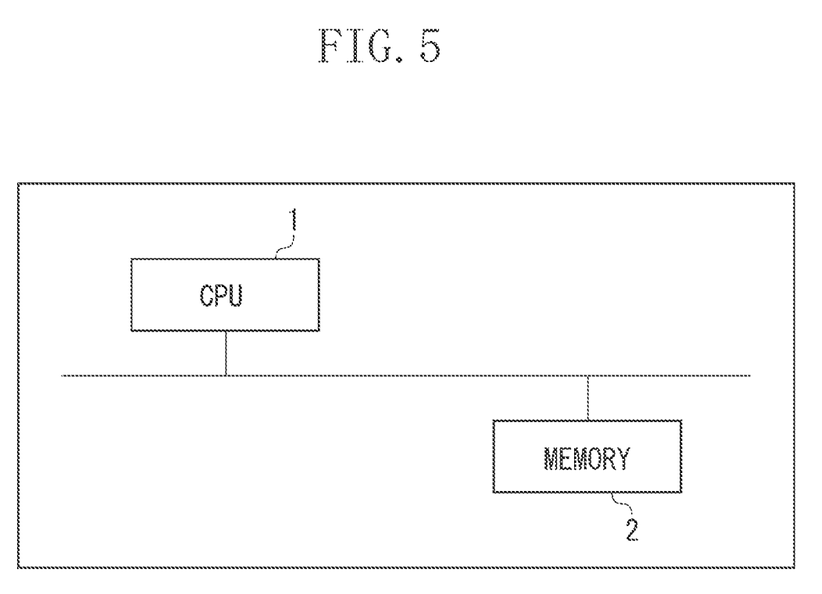
FIG. 5 illustrates an example of a hardware configuration of the image recognition apparatus.

In the exemplary embodiment described above, an example in which respective units in the image recognition apparatus are mounted as hardware as illustrated in FIG. 1 is described. However, the present invention may be realized by software which can function as respective units by a central processing unit (CPU) 1 executing a program stored in a memory 2 as illustrated in FIG. 5. In a case of a hardware configuration in FIG. 5, the respective storage units 210, 220, 230, 240, and 250 in FIG. 1 are constituted in the memory 2, however, this configuration does not limit the present exemplary embodiment. The respective storage units may be constituted by different storage media (e.g., a memory, a register, or a disk device).

Further, the present invention can be realized by executing the following processing. More specifically, software (a program) for realizing the functions of the above exemplary embodiment is supplied to a system or an apparatus via a network or various storage media, and a computer (or a CPU or a micro processing unit (MPU)) of the system or the apparatus reads and executes the program.

In the image recognition apparatus described above, local feature amounts are extracted from a plurality of pieces of images, a plurality of the local feature amounts is selected for each region according to a distribution of the local feature amounts, and is registered as a dictionary. In other words, the image recognition apparatus described above stores the feature amounts having representative variation for each region and expresses a variation of the whole recognition target with combinations of the feature amounts. As a result, even if the registered data amounts are relatively small, recognition can be performed with a high accuracy.

Further, according to the above described exemplary embodiment, in a case where the recognition target or the shooting condition is changed, the image recognition apparatus can perform the recognition with a high accuracy even if the registered data amount is relatively small.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-138693 filed Jun. 22, 2011, which is hereby incorporated by reference herein in its entirety.

What is claimed is:

1. A dictionary data registration apparatus comprising:
   a dictionary configured to store a local feature amount for each region of an image with respect to each of a plurality of categories;
   an extraction unit configured to extract respective local feature amounts from each of a plurality of regions of a plurality of input images of a category;
   a discrimination unit configured to discriminate an attribute of each of the extracted local feature amounts;
   a first selection unit configured to select a representative local feature amount having a representative variation from the plurality of the local feature amounts for each region extracted by the extraction unit from that region of the plurality of input images based on the attribute of each of the extracted local feature amounts;
   a calculation unit configured to calculate a similarity between the extracted local feature amounts;
   a second selection unit configured to select a local feature amount based on the similarity between that local feature amount and the representative local feature amount; and
   a registration unit configured to register the representative local feature amount and the local feature amount selected by the second selection unit on the dictionary as a local feature amount for that region with respect to the category.

2. The dictionary data registration apparatus according to claim 1, wherein the first selection unit selects the representative local feature amount for each region based on a difference between each attribute of the local feature amounts and a representative attribute registered in advance.

3. The dictionary data registration apparatus according to claim 1,
   wherein the second selection unit selects a local feature amount whose similarity with the representative local feature amount is lower than a threshold value for that region.

4. The dictionary data registration apparatus according to claim 1, wherein the image is an image including a face, and the attribute is an attribute relating to an orientation or expression of the face.

5. The dictionary data registration apparatus according to claim 1, wherein the image is an image including a face, and the category is a face of an individual person.

6. The dictionary data registration apparatus according to claim 1, wherein the extraction unit detects a predetermined plurality of feature points from the input image, and extracts the local feature amount from a plurality of regions which is in a predetermined positional relationship with respect to each of the plurality of the feature points.

7. An image recognition apparatus comprising:
   a dictionary data registration apparatus according to claim 1; and
   a category determination unit configured to compare a local feature amount extracted from an input image and a local feature amount registered in the dictionary, and to determine a category to which the input image belongs.

8. A method for registering dictionary data, the method comprising:
   storing, by a dictionary, a local feature amount for each region of an image with respect to each of a plurality of categories;
   extracting, using a processor, respective local feature amounts from each of a plurality of regions of a plurality of input images of a category;

discriminating, using the processor, an attribute of each of the extracted local feature amounts;

selecting, by a first selection unit, a representative local feature amount having a representative variation from the plurality of the local feature amounts for each region extracted by the extracting step from that region of the plurality of input images based on the attribute of each of the extracted local feature amounts;

calculating, using the processor, a similarity between the extracted local feature amounts;

selecting, by a second selection unit, a local feature amount based on the similarity between that local feature amount and the representative local feature amount; and registering the representative local feature amount and the local feature amount selected by the second selection unit on the dictionary as a local feature amount for that region with respect to the category.

9. A non-transitory computer readable storage medium storing a program for causing a computer to execute a method according to claim 8.

* * * * *